United States Patent
Ojala

[15] 3,672,342
[45] June 27, 1972

[54] SYSTEM FOR CONTROLLING AIR AND FUEL TEMPERATURE

[72] Inventor: William K. Ojala, Dearborn Heights, Mich.

[73] Assignee: Ford Motor Company, Dearborn, Mich.

[22] Filed: Sept. 2, 1970

[21] Appl. No.: 68,836

[52] U.S. Cl.............123/122 B, 123/122 C, 123/122 D, 55/267, 55/DIG. 28, 261/145, 261/158
[51] Int. Cl.......................................................F02m 31/08
[58] Field of Search............123/122 R, 122 C, 122 B, 122 E, 123/122 D, 122 H; 55/DIG. 28, 267, 268, 269, 222; 261/144–145, 158, 159

[56] References Cited

UNITED STATES PATENTS

| | | | |
|---|---|---|---|
| 1,234,995 | 7/1917 | Adams | 123/122 C |
| 1,644,233 | 10/1927 | Brindley | 261/159 |
| 2,781,032 | 2/1957 | Sebok et al. | 123/122 D |
| 1,980,496 | 11/1934 | Musselwhite | 261/144 |

*Primary Examiner*—Al Lawrence Smith
*Attorney*—John R. Faulkner and Glenn S. Arendsen

[57] ABSTRACT

Liquid fuel on its way to the carburetor passes through a small heat exchanger located in the air cleaner downstream of an air temperature control mechanism that mixes heated and ambient air to produce air having a temperature within a relatively narrow range. The heat exchanger heats or cools the liquid fuel as necessary to supply liquid fuel having approximately the same temperature range.

2 Claims, 2 Drawing Figures

PATENTED JUN 27 1972

3,672,342

INVENTOR
WILLIAM K. OJALA

BY John R. Faulkner
Glenn S. Arendsen
ATTORNEYS 3,672,342

SYSTEM FOR CONTROLLING AIR AND FUEL TEMPERATURE

SUMMARY OF THE INVENTION

Undesirable exhaust emissions from reciprocating internal combustion engines have been reduced significantly in recent years by maintaining the temperature of the air entering the carburetor within a relatively narrow range during most phases of engine operation. Such temperature control is achieved usually by including a thermostatically positioned mixing valve in the air inlet to the air cleaner assembly. The mixing valve automatically regulates the proportions of heated air drawn across the engine exhaust manifold and underhood air to produce a mixed air stream within the desired temperature range.

This invention provides an induction system that maintains both air temperature and fuel temperature within relatively narrow ranges. In an internal combustion engine having a fuel metering means for metering fuel and air to a combustion chamber and an exhaust manifold for conducting exhaust gases away from the combustion chamber, the system comprises an air temperature control mechanism for providing to the engine carburetor air having a temperature within a predetermined range, and a fuel temperature control device for providing fuel that also is within a predetermined temperature range. The air temperature control mechanism usually includes a heating device for producing heated air having a temperature above the predetermined range and a mixing device for mixing the heated air with ambient air in the necessary proportions. Air usually is maintained at a temperature between about 90°F. and 110° F. Significant emission improvements are achieved by maintaining liquid fuel temperatures within a slightly broader range, typically about 70°–110° F.

In a highly convenient arrangement, the air temperature control mechanism is attached to the air inlet to the carburetor air cleaner and the fuel temperature control device comprises a heat exchanger located in the air cleaner and in the mixed air produced by the air temperature control device. An air filtering element can be located either downstream or upstream of the heat exchanger although the downstream location is preferred because it provides a larger space for the heat exchanger. Heat exchangers of the simple U-type can be located in the air cleaner at the entrance of the mixed air stream thereto or a heat exchanger having a circular construction can be located between the filtering element and the air cleaner tray.

DETAILED DESCRIPTION

Figure 1:
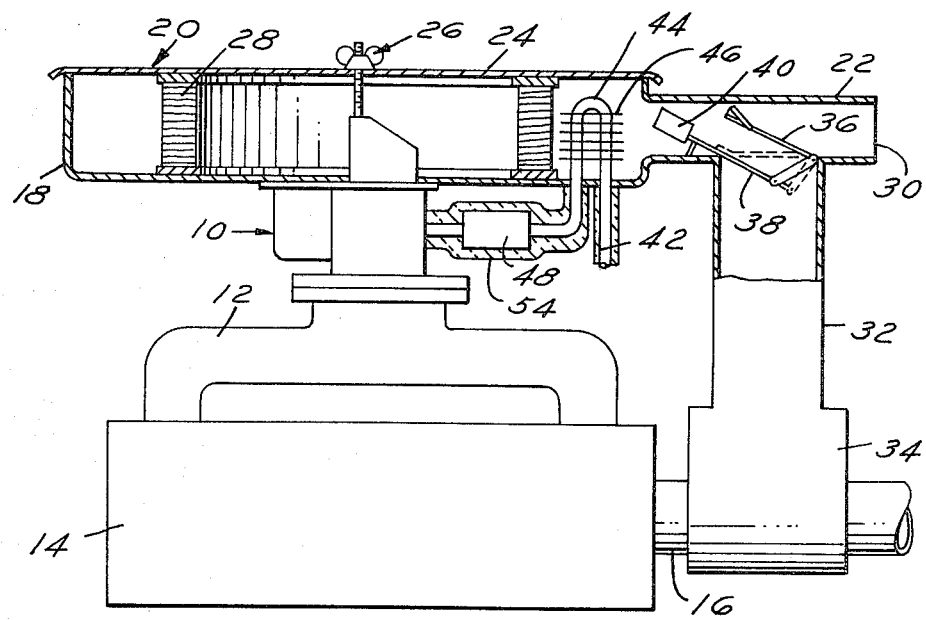
FIG. 1 is a partially sectioned elevation of an induction system of the invention in which the fuel supply line contains a U-type heat exchanger located in the air cleaner housing at the exit opening of the air temperature control mechanism.

Referring to FIG. 1, a carburetor 10 is mounted on an intake manifold 12 that conducts air and fuel to the combustion chambers of a reciprocating internal combustion engine 14. Engine 14 includes a conventional exhaust manifold 16 that conducts hot exhaust gases away from the combustion chambers.

The tray 18 of an air cleaner assembly 20 is mounted on top of carburetor 10. Tray 18 has a substantially circular construction with an elongated air inlet tube 22 attached to its periphery. Tube 22 can be formed integrally with the tray. A cover 24 closes the top of the tray 18 and is fastened to the carburetor by a stud and wing-nut assembly 26. A conventional cylindrical filter element 28 is located within air cleaner assembly 20 where element 28 filters the air stream flowing from tube 22 to the carburetor.

Air inlet tube 22 has an ambient air opening 30 that communicates directly with the ambient, which can be either the underhood environment or the air outside of the car. A warm air tube 32 connects with tube 22 a short distance downstream of opening 30. The other end of tube 32 is connected to a stove 34 that surrounds a portion of exhaust manifold 16.

A flap-type valve 36 is mounted pivotally at the junction of tubes 22 and 32. Valve 36 is connected by a lever assembly 38 to a thermostatic element 40 that is located within tube 22 downstream of the junction of the tubes.

The fuel line 42 that supplies liquid fuel to carburetor 10 has an integral U-shaped section 44 located within tray 18 directly downstream of the point where tube 22 enters the tray. U-shaped section 44 has a plurality of heat conducting fins 46 attached thereto so the section serves as a small heat exchanger. A conventional fuel filter 48 connects section 44 with the carburetor.

During engine operation, air is drawn from tube 22 across section 44 and its fins 46, through filter element 28, and into carburetor 10 where the air mixes with the liquid fuel supplied through line 42. Thermostatic element 40 senses the temperature of the air downstream of the junction of tubes 22 and 32 and expands or contracts to position flap valve 36 in a lowered position where it substantially closes off tube 32, a raised position where it substantially closes off inlet 30, or a modulated position.

Element 40 usually is calibrated so the temperature of the air stream entering the air cleaner is between about 90 and 110° F. When the ambient temperature is below this range, element 40 moves valve 36 to a position where heated air drawn through tube 32 from stove 34 mixes with an appropriate proportion of ambient air drawn through inlet 30 to produce a mixed air stream within the temperature range. When ambient temperature is within this range, element 40 moves valve 36 to a lower position where it substantially closes tube 32. Element 40, valve 36 and the associated hardware make up an air temperature control mechanism. Additional details of construction and operation of the air temperature control mechanism can be found in Sendelbach U.S. Pat. No. 3,450,119.

The mixed air stream leaving tube 22 passes over U-shaped section 44 and its attached fins 46. Heat is transferred to or from the liquid fuel passing through section 44 to adjust the liquid fuel temperature entering the carburetor to a predetermined temperature range, which typically is about 70° to 110° F. The air then passes through air filter element 28 and enters the carburetor where it mixes with the liquid fuel passing through fuel filter 48.

Figure 2:
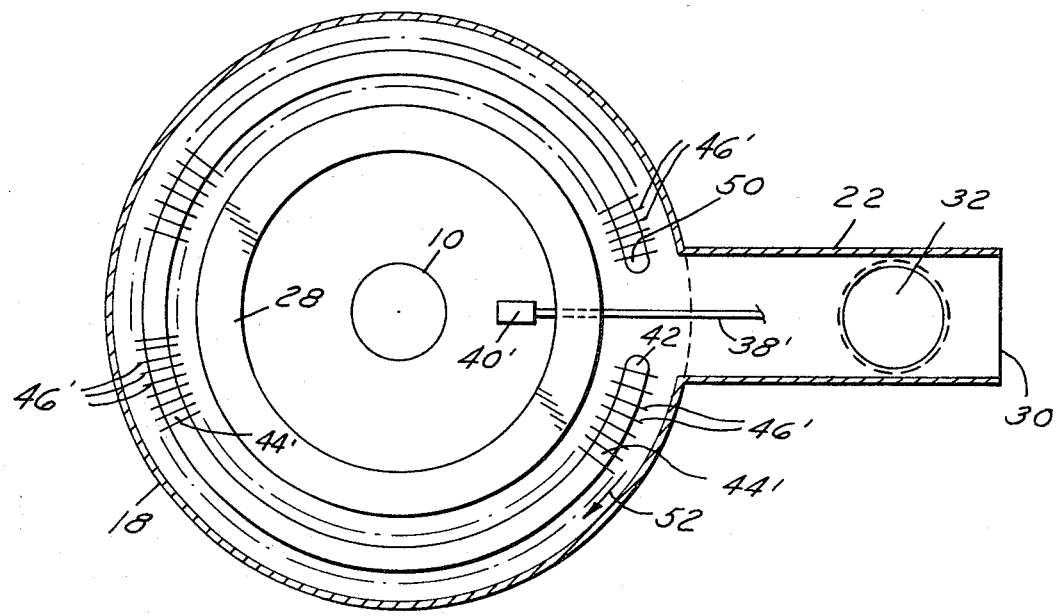
FIG. 2 is a plan view of an alternate arrangement in which a partially circular heat exchanger for the liquid fuel is located concentrically in the air cleaner housing. The air cleaner cover and the air temperature control mechanism have been removed from FIG. 2 for clarity.

Turning to the alternate construction of FIG. 2, fuel line 42 passes upward through the floor of tray 18 and connects with a circularly shaped tube section 44'. Tube section 44' extends almost entirely around filter element 28 and exits through the floor of tray 18 at 50 where it connects with fuel filter 48 (FIG. 1). Section 44' contains a plurality of heat conducting fins 46'. The mixed air stream entering the air cleaner assembly from tube 22 flows at least partially through the annular space surrounding filter 28 before passing through the filter. Liquid fuel flows through section 44' in the direction of arrow 52 and section 44' transfers heat to or from the liquid fuel.

The amount of heat transferred to or from the liquid fuel usually has relatively little effect on the temperature of the air. If desired, the thermostatic element controlling flap valve 36 can be located downstream of the fuel heat exchanger as illustrated by the position of element 40' in FIG. 2. Locating element 40' also downstream of filter element 28 insures that the element senses a temperature representative of the entire air stream entering the carburetor.

In cold weather, the system of the invention rapidly warms the liquid fuel to the predetermined temperature range for improved fuel metering and vaporization. This diminishes the choking action by the carburetor choke mechanism necessary for good driveability and thus permits more freedom in choke design and operation. In warmer weather, vehicle soaking can raise fuel temperatures considerably above 110° F. The fuel temperature declines rapidly to the temperature range when the vehicle is started, thereby reducing excessive vapor enrichment, stabilizing hot idling and the low speed operation typically encountered in heavy urban traffic, improving fuel economy and improving acceleration.

Insulation 54 can be applied to the fuel line and fuel filter if desired. A short length of rubber tubing can connect the fuel heat exchanger to the fuel line from the engine fuel pump to reduce heat conduction to or from the fuel line. Locating fuel filter 48 downstream of the fuel heat exchanger improves fuel filtering.

Thus the system of the invention provides highly significant benefits in reducing vehicle emissions and increasing vehicle performance and driveability with minimal material and installation costs. The controlled temperature ranges of both the fuel and the air can be adjusted according to fuel characteristics and engine requirements. For example, the temperature ranges can be increased for vehicles operating in relatively warm climates or decreased for vehicles in relatively cool climates. The temperature ranges also can be increased for fuel having reduced volatility. In addition to its direct benefits, the system improves design flexibility of numerous other air and fuel metering devices.

I claim:

1. In an internal combustion engine having a fuel metering means for metering fuel and air to a combustion chamber and an exhaust manifold for conducting exhaust gases away from the combustion chamber, an induction system comprising air temperature control means for providing to said fuel metering means air having a temperature within a predetermined range, said air temperature control means including heating means for producing heated air having a temperature above said predetermined range and mixing means for mixing said heated air with ambient air to produce air having a temperature within said predetermined range, an air cleaner means for filtering the air being provided to the fuel metering means, said air cleaner means including a housing having an inlet receiving the mixed air from said mixing means, an outlet for transmitting the air to the engine, and a filter element for filtering the air passing from said inlet to said outlet, fuel temperature control means for providing fuel to said combustion chamber at a temperature within a predetermined range, said fuel temperature control means including a heat exchanger located in the mixed air stream resulting from said mixing means, said heat exchanger adjusting the fuel temperature according to the temperature of the mixed air stream, and temperature sensing means for controlling said mixing means, said temperature sensing means being located downstream of said fuel heat exchanger and said filter element.

2. The engine of claim 1 comprising a fuel filter for filtering liquid fuel entering the fuel metering means, said fuel filter being located downstream of the fuel heat exchanger.

* * * * *